US012726965B2

(12) United States Patent
Yadav et al.

(10) Patent No.: US 12,726,965 B2
(45) Date of Patent: Sep. 1, 2026

(54) SYSTEMS AND METHODS FOR INITIAL CHANNEL SELECTION FOR A PLURALITY OF CITIZENS BROADBAND RADIO SERVICE DEVICES CONTROLLED BY A SPECTRUM ACCESS SYSTEM

(71) Applicant: ARRIS Enterprises LLC, Suwanee, GA (US)

(72) Inventors: Shailendra Yadav, Gurgaon (IN); Rajesh Kaliaperumal, San Jose, CA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 281 days.

(21) Appl. No.: 18/659,699

(22) Filed: May 9, 2024

(65) Prior Publication Data

US 2024/0406943 A1 Dec. 5, 2024

Related U.S. Application Data

(60) Provisional application No. 63/506,335, filed on Jun. 5, 2023.

(51) Int. Cl.

| | |
|---|---|
| ***H04W 72/04*** | (2023.01) |
| ***H04W 16/14*** | (2009.01) |
| ***H04W 60/00*** | (2009.01) |
| ***H04W 72/0453*** | (2023.01) |

(52) U.S. Cl.

CPC ....... *H04W 72/0453* (2013.01); *H04W 16/14* (2013.01); *H04W 60/00* (2013.01)

(58) Field of Classification Search

CPC . H04W 72/0453; H04W 16/14; H04W 60/00; H04W 60/005; H04W 72/23; H04W 84/042

See application file for complete search history.

(56) References Cited

U.S. PATENT DOCUMENTS

| | | | | |
|---|---|---|---|---|
| 11,784,706 | B2 * | 10/2023 | Taneja | H04B 7/155 370/280 |
| 2020/0305159 | A1 * | 9/2020 | Raghothaman | H04W 72/0453 |
| 2022/0022049 | A1 * | 1/2022 | Park | H04W 72/0453 |
| 2022/0264287 | A1 * | 8/2022 | Vaidya | H04W 88/08 |
| 2022/0272701 | A1 | 8/2022 | Hannan et al. | |
| 2022/0345896 | A1 * | 10/2022 | Ahmed | H04W 16/14 |
| 2023/0043541 | A1 * | 2/2023 | Mueller | H04W 16/14 |
| 2023/0199507 | A1 * | 6/2023 | Mueller | H04W 72/23 370/329 |
| 2023/0337149 | A1 * | 10/2023 | Srinivasan | H04W 52/367 |
| 2024/0114352 | A1 * | 4/2024 | Bandyopadhyay | H04W 16/14 |

(Continued)

OTHER PUBLICATIONS

Wireless Innovation Forum, "Signaling Protocols and Procedures for Citizens Broadband Radio Service (CBRS): Spectrum Access System (SAS)—Citizens Broadband Radio Service Device (CBSD) Interface Technical Specification", Document WINNF-TS-0016, Version V1.2.7, Mar. 21, 2022, pp. cover through 52.

*Primary Examiner* — Khawar Iqbal

(74) *Attorney, Agent, or Firm* — Fogg & Powers LLC

(57) ABSTRACT

Techniques are provided for more timely utilization of citizen broadband radio service device(s) (CBSD(s)) of a plurality of CBSDs. Prior to activation of CBSD(s) of a plurality of CBSDs, frequency spectra in which each CBSD can transmit is obtained from the SAS and a transmission frequency spectrum for each CBSD is selected from the obtained frequency spectra.

19 Claims, 4 Drawing Sheets

(56) References Cited

U.S. PATENT DOCUMENTS

2024/0187931 A1* 6/2024 Mueller .............. H04W 72/543
2025/0016785 A1* 1/2025 Singh .................... H04W 72/23
2025/0070938 A1* 2/2025 Sevindik .............. H04B 7/0413
2025/0254010 A1* 8/2025 Lin ..................... H04W 72/566

* cited by examiner

SYSTEMS AND METHODS FOR INITIAL CHANNEL SELECTION FOR A PLURALITY OF CITIZENS BROADBAND RADIO SERVICE DEVICES CONTROLLED BY A SPECTRUM ACCESS SYSTEM

CROSS-REFERENCE TO RELATED APPLICATIONS

The present application claims benefit of U.S. Patent Application Ser. No. 63/506,335 filed Jun. 5, 2023; the entire contents of the aforementioned patent application are incorporated herein by reference as if set forth in its entirety.

BACKGROUND

A citizens broadband radio service (CBRS) includes incumbent users of shared spectrum and secondary users of shared spectrum. An incumbent user may also be referred to as a primary user. Incumbent users have priority access to transmit in the spectrum shared with the secondary users. If a secondary user seeks permission to transmit on spectrum shared by incumbent user(s) and/or other secondary user(s), it will only be permitted to do so to the extent its transmissions do not raise aggregate interference at the incumbent user(s) and/or other secondary user(s) above corresponding interference threshold levels for each of such incumbent user(s) and secondary user(s).

Such secondary users use citizen broadband radio service device(s) (CBSD(s)). A CBSD is a radio including a transmitter coupled to an antenna, e.g., an access point or base station. A CBRS system includes a spectrum access system (SAS) which regulates the transmissions of CBSD(s) in shared spectrum under the SAS's control, e.g., whether each CBSD of a SAS can transmit in the shared spectrum, and if so then at what power level. The requesting secondary user is a user requesting to transmit in shared spectrum controlled by a SAS and shared with higher priority user(s) and/or other secondary user(s) whose transmission(s) are controlled by the SAS. The SAS must authorize the requesting user to transmit in the spectrum shared with higher priority user(s) and/or the other secondary user(s) controlled by the SAS.

U.S. Patent Publication No. 2022/0272701 (hereinafter the '701 Publication) describes techniques for operating CBSDs controlled by a SAS. The '701 Publication is incorporated by reference herein in its entirety. The '701 Publication discloses that a spectrum proxy is configured to forward certain grant request(s) to the SAS to obtain allocation of spectrum to the CBSDs. Conventionally, a SAS periodically, e.g., every twenty four hours, allocates spectrum to new requestors when performing coordinated periodic activities among SASs (CPAS). When the CBSDs are first activated, such CBSDs require a frequency spectrum grant (including frequency spectrum authorization and corresponding maximum transmit power level) to commence operation. Conventionally, a grant request is submitted to the SAS for each such CBSD activation. Particularly because of CPAS, there can be a significant delay in receiving response(s) to such spectrum grant request(s).

SUMMARY OF THE INVENTION

A method of efficiently assigning frequency channels to one or more citizen broadband radio service devices (CBSDs) of a plurality of CBSDs is provided. The method comprises: receiving CBSD registration information from each CBSD of the plurality of CBSDs; transmitting, to a spectrum access system (SAS) and for each CBSD of the plurality of CBSDs, a registration request including the CBSD registration information; receiving, at the SAS, a registration response, for each CBSD, indicating successful registration of a CBSD; transmitting, to the SAS configured to regulate transmissions of at least one CBSD in frequency spectrum shared with at least one other apparatus, a frequency spectrum inquiry for each CBSD of the plurality of CBSDs; receiving, from the SAS, a frequency spectrum inquiry response for each CBSD of the plurality of CBSDs, wherein each frequency spectrum inquiry response includes at least one available frequency channel in which the SAS is configured to permit CBSD transmission; transmitting, to the SAS, a grant request, for each CBSD of the plurality of CBSDs, for at least one of the at least one available frequency channel identified in the frequency spectrum inquiry response for a CBSD of the plurality of CBSDs on whose behalf a corresponding grant request is transmitted; receiving, from the SAS, a grant request response for each CBSD of the plurality of CBSDs and which includes (x) authorization to transmit in at least one of the at least one of the at least one available frequency channel and (y) a maximum transmit power level corresponding to each of the at least one of the at least one of the at least one available frequency channel; transmitting, to each baseband component of the plurality of CBSDs, a query for information; receiving, from each baseband component of the plurality of CBSDs, a query response including information including at least one bandwidth at which a baseband component, which sent a corresponding query response, can operate; for each CBSD of the plurality of CBSDs and using the at least one bandwidth at which a baseband component, which is part of a corresponding CBSD of the plurality of CBSDs, can operate, selecting at least one of at least one of the at least one of the at least one available frequency channel received in a grant response for the corresponding CBSD of the plurality of CBSDs; transmitting, to the SAS and for each CBSD, a heartbeat request; receiving, from the SAS and for each CBSD, a heartbeat response authorizing CBSD transmission using parameters sent in the corresponding grant request; receiving a status notification from each CBSD of the plurality of CBSDs indicating that a CBSD, which sent a corresponding status notification, is ready to transmit and receive; and transmitting, to each CBSD, an acknowledgement of receipt of a status notification and selected one or more available frequency channels and a corresponding maximum transmit power level.

A program product, comprising a non-transitory processor readable medium on which program instructions are embodied, is provided. The program instructions are configured, when executed by at least one programmable processor, to cause the at least one programmable processor to execute a process to efficiently assign frequency channels to one or more citizen broadband radio service devices (CBSDs) of a plurality of CBSDs. The process comprises: receiving CBSD registration information from each CBSD of the plurality of CBSDs; causing transmission, to a spectrum access system (SAS) and for each CBSD of the plurality of CBSDs, of a registration request including the CBSD registration information; receiving, at the SAS, a registration response, for each CBSD, indicating successful registration of a CBSD; causing transmission, to the SAS configured to regulate transmissions of at least one CBSD in frequency spectrum shared with at least one other apparatus, of a frequency spectrum inquiry for each CBSD of the plurality of CBSDs; receiving, from the SAS, a frequency spectrum inquiry response for each CBSD of the plurality of CBSDs, wherein each frequency spectrum inquiry response includes at least one available frequency channel in which the SAS is configured to permit CBSD transmission; causing transmission, to the SAS, of a grant request, for each CBSD of the plurality of CBSDs, for at least one of the at least one available frequency channel identified in the frequency spectrum inquiry response for a CBSD of the plurality of CBSDs on whose behalf a corresponding grant request is transmitted; receiving, from the SAS, a grant request response for each CBSD of the plurality of CBSDs and which includes (x) authorization to transmit in at least one of the at least one of the at least one available frequency channel and (y) a maximum transmit power level corresponding to each of the at least one of the at least one of the at least one available frequency channel; causing transmission, to each baseband component of the plurality of CBSDs, of a query for information; receiving, from each baseband component of the plurality of CBSDs, a query response including information including at least one bandwidth at which a baseband component, which sent a corresponding query response, can operate; for each CBSD of the plurality of CBSDs and using the at least one bandwidth at which a baseband component, which is part of a corresponding CBSD of the plurality of CBSDs, can operate, selecting at least one of at least one of the at least one of the at least one available frequency channel received in a grant response for the corresponding CBSD of the plurality of CBSDs; causing transmission, to the SAS and for each CBSD, of a heartbeat request; receiving, from the SAS and for each CBSD, a heartbeat response authorizing CBSD transmission using parameters sent in the corresponding grant request; receiving a status notification from each CBSD of the plurality of CBSDs indicating that a CBSD, which sent a corresponding status notification, is ready to transmit and receive; and causing transmission, to each CBSD, of an acknowledgement of receipt of a status notification and selected one or more available frequency channels and a corresponding maximum transmit power level.

An apparatus configured to efficiently assign frequency channels to one or more citizen broadband radio service devices (CBSDs) of a plurality of CBSDs is provided. The apparatus comprises: processor circuitry communicatively coupled to each CBSD of the plurality of CBSDs, communicatively coupled to a spectrum access system (SAS), and configured to: receive CBSD registration information from each CBSD of the plurality of CBSDs; cause transmission, to the SAS and for each CBSD of the plurality of CBSDs, of a registration request including the CBSD registration information; receive, at the SAS, a registration response, for each CBSD, indicating successful registration of a CBSD; cause transmission, to the SAS configured to regulate transmissions of at least one CBSD in frequency spectrum shared with at least one other apparatus, of a frequency spectrum inquiry for each CBSD of the plurality of CBSDs; receive, from the SAS, a frequency spectrum inquiry response for each CBSD of the plurality of CBSDs, wherein each frequency spectrum inquiry response includes at least one available frequency channel in which the SAS is configured to permit CBSD transmission; cause transmission, to the SAS, of a grant request, for each CBSD of the plurality of CBSDs, for at least one of the at least one available frequency channel identified in the frequency spectrum inquiry response for a CBSD of the plurality of CBSDs on whose behalf a corresponding grant request is transmitted; receive, from the SAS, a grant request response for each CBSD of the plurality of CBSDs and which includes (x) authorization to transmit in at least one of the at least one of the at least one available frequency channel and (y) a maximum transmit power level corresponding to each of the at least one of the at least one of the at least one available frequency channel; transmitting, to each baseband component of the plurality of CBSDs, a query for information; receive, from each baseband component of the plurality of CBSDs, a query response including information including at least one bandwidth at which a baseband component, which sent a corresponding query response, can operate; for each CBSD of the plurality of CBSDs and using the at least one bandwidth at which a baseband component, which is part of a corresponding CBSD of the plurality of CBSDs, can operate, select at least one of at least one of the at least one of the at least one available frequency channel received in a grant response for the corresponding CBSD of the plurality of CBSDs; cause transmission, to the SAS and for each CBSD, of a heartbeat request; receive, from the SAS and for each CBSD, a heartbeat response authorizing CBSD transmission using parameters sent in the corresponding grant request; receive a status notification from each CBSD of the plurality of CBSDs indicating that a CBSD, which sent a corresponding status notification, is ready to transmit and receive; and cause transmission, to each CBSD, of an acknowledgement of receipt of a status notification and selected one or more available frequency channels and a corresponding maximum transmit power level.

BRIEF DESCRIPTION OF THE DRAWINGS

Comprehension of embodiments of the invention is facilitated by reading the following detailed description in conjunction with the annexed drawings, in which.

DETAILED DESCRIPTION

Figure 1A:
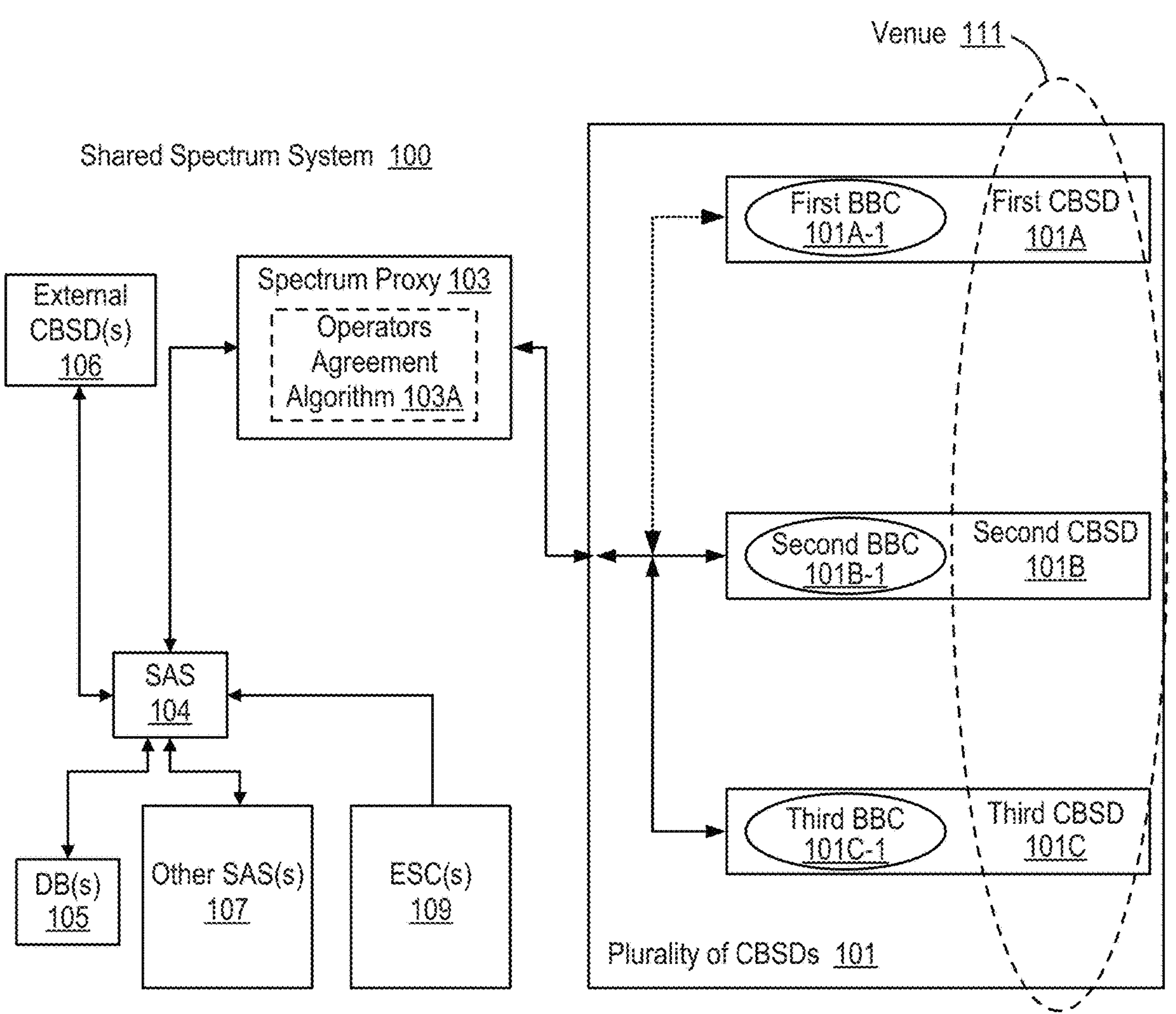
FIG. 1A illustrates a block diagram of one embodiment of a shared spectrum system including a plurality of CBSDs communicatively coupled to a SAS through a spectrum proxy.

Embodiments of an invention provide for more promptly allocating frequency spectrum and a maximum transmit power level (e.g., in effective isotropic radiated power (EIRP)) to each CBSD, of a plurality of CBSDs, that is controlled by a SAS and shares spectrum with incumbent user(s) and/or other secondary users (e.g., external radio(s)[1]). Rather, then wait for each CBSD (or component(s) thereof) of the plurality of CBSDs to be activated, a spectrum proxy can be secure grants of frequency spectra (and corresponding maximum transmit power levels) from the SAS prior to activation of each CBSD of the plurality of CBSDs (or components thereof), and assign such frequency spectrum and a corresponding maximum transmit power level to each CBSD upon activation of the CBSD (including all of its component(s)).

[1] External radios mean radios (e.g., CBSDs) external to a venue 111 and not part of the plurality of CBSDs 101. Transmission of each external radio may be managed by the SAS 104 or other SAS(s) 107.

Unless otherwise indicated herein, power as used herein means power or power spectral density. Conventionally, power levels for a CBRS are characterized in terms of power spectral density levels. Although embodiments of the invention are applicable to and are exemplified in the context of CBRS for pedagogical purposes, the embodiments are applicable to other shared spectrum systems, such as for example licensed spectrum access systems or authorized access systems. Each CBSD of the plurality of CBSDs to which are assigned frequency spectrum and a maximum transmit power level is a secondary user. Each CBSD of the plurality of CBSDs is implemented by a base station regardless of architecture and wireless air interface utilized. Optionally, each CBSD of the plurality of CBSDs may be implemented (a) monolithically (i.e., incorporating all base station functions), e.g., as a femtocell, (b) with architecture typically used in 4G (e.g., with a baseband unit and a remote radio head), or (c) with architecture typically used in 5G New Radio (NR) (e.g., with a centralized unit (CU), a distributed unit (DU), and at least one radio unit (RU)) for example; exemplified by open radio access network (O-RAN) architecture.

During dynamic operation of the CBRS, embodiments of an invention may be used to allocate frequency spectrum and/or maximum transmission power (e.g., in EIRP) to a CBSD of the plurality of CBSDs with less time delay. Optionally, the foregoing may be implemented with a spectrum proxy, which is subsequently described. The spectrum proxy may be alternatively referred to as a self optimizing network module.

A CBRS system comprises general authorized access (GAA) and/or priority access license (PAL) CBSDs, and higher priority users. The higher priority users, such as government users for example radar systems, e.g., on ships, have priority access to certain spectrum in the shared spectrum. A SAS grants the CBSDs access to the shared spectrum, including authorizing frequency spectrum (or channels) requested by CBSDs, and authorizing a corresponding requested maximum transmission power or assigning a lower maximum transmission power. The SAS controls the transmission of GAA CBSDs so that PAL CBSDs and the higher priority users are free of interference from GAA CBSDs. The GAA and PAL CBSDs are secondary users; the PAL CBSDs are secondary users because they have lower priority than higher priority users (i.e., incumbent users) such as naval vessels. The SAS also controls the transmission of PAL CBSDs so that higher priority users are free of interference from PAL CBSDs.

Free of interference as used herein does not mean an absence of interference, but rather means an acceptable level of interference which may be no interference or a finite level of interference. The acceptable level of interference may vary by geography, frequency spectrum, user type, license type, and/or other indicia.

GAA CBSDs may be of two types: category A (low transmission power) and category B (high transmission power). Category A has a maximum transmission power spectral density of 30 dBm/10 MHz. Category B has a maximum transmission power spectral density of 47 dBm/10 MHz.

Higher priority users of shared spectrum have first, or highest, priority to utilize the shared spectrum controlled by the SAS. Thus, higher priority users (e.g., the receivers of higher priority users' communications systems or radios) shall be able to operate free of interference from other users, e.g., communications systems of priority access licensees and general authorized access users. In one embodiment, the higher priority users include government entities operating systems such as communications systems, operators of fixed satellite communications systems, and grandfathered, prior licensees of the frequency spectrum. Communications systems, as used herein, shall include radar systems (or radars) and satellite ground stations.

In one embodiment, PAL users have second (or intermediate) priority, after higher priority users (excluding PAL users), to utilize the frequency spectrum controlled by the SAS. In another embodiment, a PAL user shall be able to operate, when higher priority users (excluding PAL users) are free of interference of such a PAL user, and free of interference from other PAL users and general authorized access users. In one embodiment, an ability of a PAL user to operate free of interference shall be limited temporally, geographically, and spectrally within the specifications of its license.

GAA users have third, or lowest, priority to utilize the frequency spectrum controlled by the SAS. In one embodiment, an operation of GAA users will be governed by laws, regulations, and/or rules (e.g., pertaining to CBRS). Such laws, regulations, and/or rules may be established by government(s) and/or standards bodies (e.g., WInnForum). For example, such rules shall only let GAA users' CBSDs operate when they do not interfere with communication systems of higher priority users.

In one embodiment, the geographic coverage area proximate to (e.g., covered by radio frequency emissions of) the CBSD may include exclusion zones and protection regions (including location(s) of fixed satellite service(s) (FSS(s)), priority access license (PAL) protection area(s) (PPA(s)), grandfathered wireless protection zone(s) (GWPZ(s)), dynamic protection area(s) (DPA(s)), and receiver(s) of environmental sensing capability (ESC) system(s)) (or ESC system receiver(s)). CBSDs are prohibited from operating in specific frequency spectrum in exclusion zones. Further, the level of interference generated by, e.g., by all non-government users and even some government users (including higher priority and GAA users) shall be limited in a protection region so as not to interfere with certain incumbent user(s)' communications systems, for example radar on naval vessels, intended to be protected by the protection region. CBSDs may only operate with the permission of the SAS when an incumbent user's communication system is operating in a protection zone. In some cases, this operation will be based upon information received by an environmental sensing capability (ESC) system, from external database (s), notification from an incumbent user, and/or from a beacon. One type of protection region is the grandfathered wireless protection zone which is a geographic area and/or frequency spectrum where grandfathered wireless broadband licensees can operate free of interference, e.g., of CBSDs. The foregoing are examples of exclusion zones and protection regions; other type of exclusion and protection regions may occur.

For a CBRS system, a higher priority user consists of a user consisting of at least one of: at least one incumbent user, at least one ESC system receiver, at least one PAL CBSD, at least one FSS, and at least one GWPZ. However, more generally, a higher priority user means a receiver of a user, or a region comprising a least one such receiver, where the receiver has a higher priority to receive, in spectrum shared with a secondary radio (or radio), than the radio has to transmit in the share spectrum.

The invention will be subsequently described in more general terms, e.g., using the term radio rather than CBSD, and shared spectrum system rather than CBRS. However, the terms CBRS and CBSD may be subsequently used when illustrating respectively such a system and a device, or their specifications.

FIG. 1A illustrates a block diagram of one embodiment of a shared spectrum system 100 including a plurality of CBSDs 101 communicatively coupled to a SAS 104 through a spectrum proxy (or spectrum proxy circuitry) 103. Each CBSD 101A, 101B, 101C of the plurality of CBSDs 101 is communicatively coupled to the SAS 104. Each CBSD 101A, 101B, 101C includes or shares a baseband component 101A-1, 101B-1, 101C-1. For example, each femtocell which is a CBSD includes its own baseband component. However, a CBSD which utilizes a baseband unit or a distributed unit may share such baseband unit or distributed unit with another CBSD.

The spectrum proxy 103 receives spectrum grants provided by the SAS 104 to component(s) of the plurality of CBSDs 101. The spectrum proxy 103 then allocates the granted spectrum (or a portion thereof) to component(s) of the plurality of CBSDs. Optionally, the spectrum proxy 103 may also serve as a domain proxy. The spectrum proxy 103 optionally comprises an operators' agreement algorithm 103A. The optional operators' agreement algorithm 103A specifies how frequency spectrum to CBSDs of the plurality of CBSDs 101 by the SAS 104 (or the bandwidth of such frequency spectrum) is partitioned by each CBSD of the plurality of CBSDs.

Figure 1B:
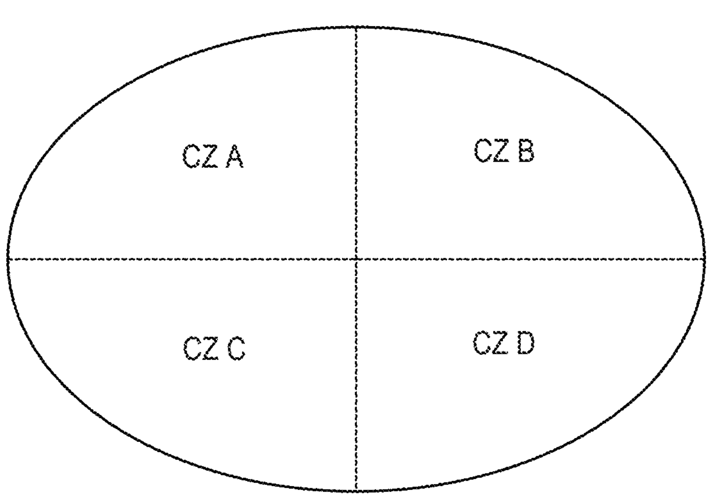
FIG. 1B illustrates a plan view of one embodiment of a venue.

Venue 111 means a geographic location to which the plurality of CBSDs provides coverage. Optionally, the venue 111 may be a structure such a stadium or an office building. Optionally, a venue may consist of one or more geographical areas (or coverage zones). FIG. 1B illustrates a plan view of one embodiment of a venue 111. The illustrated venue 111 consists of four coverage zones CZ A, CZ B, CZ C, and CZ D. Although the coverage zones are illustrated as having equal areas, coverage zones may have differently sized areas.

Returning to FIG. 1A, optionally, the spectrum proxy 103 may comprise software stored in and executed by a processing system (or circuitry)[2] such as a state machine, a neural network, and/or a quantum computer. The processor circuitry may execute the software stored in the memory circuitry. Optionally, the spectrum proxy 103 may be executed by the same processing system that executes the SAS 104. Optionally, the spectrum proxy 103 may be executed by a processing system within the plurality of CBSDs 101, e.g., in a data distribution circuit.

[2] Optionally, the processing system may be a cloud computing system. Optionally, the state machine comprises processor circuitry coupled to memory circuitry.

The shared spectrum system 100 comprises the SAS 104 communicatively coupled, e.g., by communications link(s) (optionally the Internet), to the spectrum proxy 103. Optionally, the SAS 104 is communicatively coupled to at least one CBSD external to a plurality of CBSDs 101 (external CBSD(s)) 106. Optionally, the SAS 104 may be coupled to one or more plurality of CBSDs.

The SAS[3] 104 is configured to control when the external CBSD(s) 106 external to a plurality of CBSDs 101 can transmit in shared spectrum, the maximum transmit power level (e.g., in effective isotropic radiated power (EIRP) level of each of the radio(s) 106 external to a plurality of CBSDs 101, and the frequency spectrum in which each of the radio(s) 106 external to the plurality of CBSDs 101 may transmit. Optionally, the radio(s) 106 external to the plurality of CBSDs 101 are communicatively coupled to the SAS 104 by the Internet and/or radio access network(s). The SAS 104 similarly controls CBSD(s) 113A-E of the plurality of CBSDs 101.

[3] Optionally, the SAS 104 comprises software stored in and executed by a processing system (or circuitry) such as a state machine, a neural network, and/or a quantum computer. Optionally, the state machine comprises processor circuitry coupled to memory circuitry. The processor circuitry may execute the software stored in the memory circuitry. The SAS 104 implemented in a processing circuitry may be referred to as SAS circuitry.

Optionally, the SAS 104 is communicatively coupled to at least one environmental sensing capability system (ESC(s) or ESC circuitry) 109. Each ESC comprises receiver(s) and is configured to detect the presence of incumbent users in one or more dynamic protection area(s). The SAS 104 is further communicatively coupled to at least one other SAS (other SAS(s)) 107; each of the other SAS(s) 107 are configured to control a unique set of radios. The SAS 104 and the other SAS(s) 107 are configured to share information about the radios under each SAS's control. Optionally, each of the other SAS(s) 107 provides the SAS 104, during CPAS, a full activity dump (FAD) comprising protection areas for PAL(s) managed by the other SAS, geographic location, and an antenna height, an antenna pattern, an antenna azimuth, an antenna down tilt, and/or interference thresholds for receivers of ESC(s) utilized by the other SAS, and information about which radios (controlled by the other SAS) are authorized by the other SAS to transmit in the shared spectrum (or active radios). The PAL protection area (PPA) comprises protection points; the PPA is a geographic area around a PAL that protects the PAL and user equipment communicating with the PAL from interference above a certain interference threshold level (e.g., −96 dBm/10 MHz).

Information about active radios may include installation parameters (e.g., an antenna geographic location, an antenna height, an antenna azimuth, an antenna down tilt angle, an antenna, pattern, authorized frequency spectrum, and/or authorized maximum transmit power (in EIRP). The foregoing information is used by the SAS 104 to protect incumbent user(s), ESC(s), and/or optionally authorized radios identified by the other SAS(s) 107 from interference from radios managed by the SAS 104. Optionally, such information is automatically provided periodically to the SAS 104, e.g., every twenty-four hours, and/or upon request of the SAS 104.

Optionally, the SAS is further communicatively coupled to at least one external database (DB(s)) 105; optionally, the external database(s) 105 comprises a database of data about incumbent users (e.g., location of protection point(s) of incumbent user, type of incumbent user, and corresponding interference threshold). Optionally, the external databases may be managed by a government agency (e.g., the U.S. Federal Communications Commission) and/or by a standard body (e.g., WInnForum). A protection point means a lateral geographic location where an incumbent user is or may be located, or which must otherwise be protected from interference by secondary users, e.g., radios (e.g., external radios) and the plurality of CBSDs 101.

The spectrum proxy 103 is, at least in part, a domain proxy. A domain proxy is configured to:

(a) manage communications between the SAS 104 and each CBSD 101A, 101B101C of the plurality of CBSDs 101; and (b) optionally, translate communications protocols used by the SAS 104 and each CBSD 101A, 101B, 101C of the plurality of CBSDs 101.

The spectrum proxy 103 is communicatively coupled, e.g., by communication link(s) for example Ethernet network(s) and/or the Internet, to each CBSD 101A, 101B, 101C of the plurality of CBSDs 101. In other embodiments, the domain proxy may be located outside of the spectrum proxy 103.

The operators' agreement algorithm 103A is based upon an agreement of operators, e.g., communications service providers for example cellular service providers, which utilize the plurality of CBSDs 101. An operators' agreement may allocate spectrum equally or unequally amongst operators who are parties to the operators' agreement. Optionally, one or more operators are allocated at a CBSD a fixed percentage of frequency spectrum utilized by the CBSD of the plurality of CBSDs 101. As is described elsewhere herein, the frequency spectrum utilized by the CBSD may be less than the frequency spectrum assigned to the CBSD by the SAS 104 because the spectrum proxy 103 can assign frequency spectrum to the CBSD that is less than the frequency spectrum assigned by the SAS 104 to the CBSD. Optionally, one or more operators are allocated at a CBSD a variable percentage of available spectrum; for example, one or more operators may only receive corresponding percentages of the assigned spectrum if the assigned spectrum has a bandwidth greater than a threshold bandwidth. Thus, the operators' agreement algorithm 103A is dependent upon the operators' agreement.

Optionally, the spectrum proxy 103, including the operators' agreement algorithm 103A, comprises software stored in and executed by a processing system (or circuitry) such as a state machine, a neural network, and/or a quantum computer. Optionally, the processing system may be a cloud computing system. Optionally, the state machine comprises processor circuitry coupled to memory circuitry. The processor circuitry may execute the software stored in the memory circuitry. The spectrum proxy 103, and thus the operators' agreement algorithm 103A, may be executed by the same processing system that executes the SAS 104. The spectrum proxy 103 implemented in a processing circuitry may be referred to as spectrum proxy circuitry.

Figure 2:
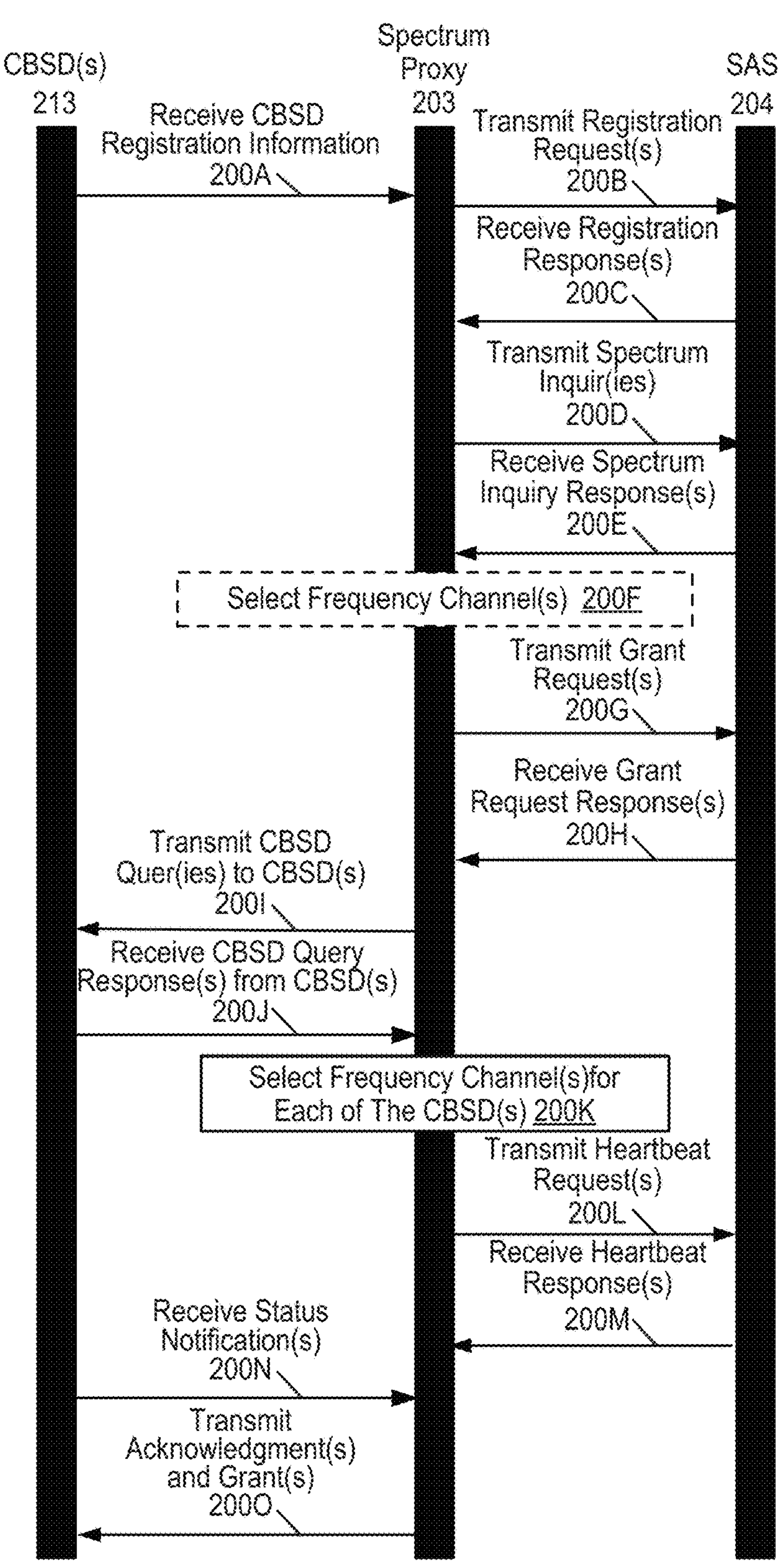
FIG. 2 illustrates a flow diagram of one embodiment of a method for determining and distributing frequency spectrum allocation and maximum transmit power level to at least one CBSD of a plurality of CBSDs.

FIG. 2 illustrates a flow diagram of one embodiment of a method 200 for determining and distributing frequency spectrum allocation and maximum transmit power level to at least one CBSD of the plurality of CBSDs. To the extent that the methods shown in any of the Figures is described herein as being implemented in the system shown in FIG. 1A, it is to be understood that other embodiments can be implemented in other ways. Thus, for example, the performance of method 200 by a spectrum proxy is solely for pedagogical purposes. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

Optionally, method 200 may be performed when a plurality of CBSDs is first installed or when new CBSD(s) are added to the plurality of CBSDs. Optionally, the method 200 may be performed just prior to a CPAS or every CPAS. For pedagogical purposes, FIG. 2 illustrates that method 200 is executed by the spectrum proxy 103; however, method 200 may be implemented by another device or system.

In block 200A, the spectrum proxy 203 receives registration information from each of the CBSD(s) 213 of the plurality of CBSDs. Such registration information of a CBSD may be provided by the CBSD to the spectrum proxy 203 or may be provided another way, e.g., by an installer to the spectrum proxy. Optionally, the registration information for each CBSD includes a unique identifier for each CBSD, an interference coordination group (ICG) to which the CBSD belongs, CBSD geographic location, and/or CBSD antenna height and antenna gain. An interference coordination group is a group of CBSD(s) whose interference amongst CBSD(s) is managed by the design or planning, e.g., by a network operator who controls each of the CBSD(s) in the group. Thus, the SAS need not manage interference amongst CBSD(s) of an ICG. Optionally, each CBSD of the group transmits in the same frequency spectrum.

In block 200B, the spectrum proxy 203 transmits, to the SAS and for each of the CBSD(s), a registration request including CBSD registration information. When block 200B is performed, some or all of such CBSD(s) 213 may be deployed but not activated for use.

In block 200C, the spectrum proxy 203 receives, from the SAS 204, a registration response, for each of the CBSD(s), indicating successful registration of a corresponding CBSD 213 with the SAS 204. Each registration response is responsive to a registration request transmitted by the spectrum proxy in block 200D. As a result, the CBSD(s) 213 for whom a registration request has been acknowledged by the SAS can be evaluated by the SAS 204, e.g., to determine frequency spectra availability and maximum transmit power level.

In block 200D, the spectrum proxy 203 transmits a spectrum inquiry to a SAS 204 for each of the CBSD(s) 213. The spectrum proxy 203 sends a unique the spectrum inquiry on behalf of each of the CBSD(s) 213.

In block 200E, the spectrum proxy 203 receives, from the SAS 204, a spectrum inquiry response for each CBSD of the plurality of CBSDs. Each spectrum inquiry response is responsive to a spectrum inquiry transmitted by the spectrum proxy in block 200D. A spectrum inquiry response identifies GAA frequency spectra (and optionally PAL frequency spectra (if a CBSD on whose behalf a spectrum inquiry was transmitted and which is used by at least one network operator that is a PAL user)) available for transmission by the CBSD.

In optional block 200F, for each of the CBSD(s) 213, the spectrum proxy 203 optionally selects all or a portion of the frequency spectrum identified in each spectrum inquiry response. Different criteria may be used to perform such identification. Optionally, in one example and for each of the CBSD(s) 213, only a portion of the identified frequency spectra are selected because their corresponding maximum transmit power level (identified in the spectrum inquiry response) exceeds a transmit power threshold level. Such transmit power threshold level may be defined by network operator(s), a system designer(s), and/or other part(ies).

In block 200G, the spectrum proxy 203 transmits, to the SAS 204, a grant request for each of the CBSD(s) 213 for at least one of the at least one available frequency channel identified in a frequency spectrum inquiry response for a CBSD (of the plurality of CBSDs) on whose behalf a corresponding grant request is transmitted. The at least one of the at least one available frequency channel may be all frequency channels identified in the spectrum inquiry response for one of the CBSD(s) 213 in block 200D or the selected frequency channel(s) for one of the CBSD(s) selected in optional block 200E. If the frequency channels for a CBSD are not contiguous, then optionally, a grant request must be submitted, for the CBSD, for each set of contiguous frequency channels.

In block 200H, the spectrum proxy 203 receives, from the SAS 204, a grant request response for each grant request submitted. Each grant request response identifies whether the CBSD(s) 213 are permitted to transmit on all or a subset of the frequency spectra requested in a corresponding grant request, and a maximum transmit power level for each frequency spectrum in which a CBSD is permitted to transmit. Frequency spectrum may also be referred to as a frequency channel or a channel.

In block 200I, the spectrum proxy 203 transmits a CBSD query to each CBSD 101B-1, 101B-2 of the plurality of CBSDs 101 to obtain information, e.g., capabilit(ies), about each such CBSD pertaining to the CBSD's baseband parameters, e.g., of a distributed unit (DU), baseband unit (BBU), or equivalent baseband component of the CBSD. In block 200J, the spectrum proxy 203 receives a CBSD query response from each CBSD about such baseband parameters. Optionally, the CBSD query response includes an identifier of a CBSD's baseband component, e.g., a DU or BBU, an identifier of a cell corresponding to the CBSD's baseband component, and/or at least one available bandwidth (e.g., 10, 20, 30, and/or 40 MHz) supported by the CBSD's baseband component. A CBSD baseband component may be capable of utilizing one or more bandwidths; such bandwidths are referred to herein as available bandwidth.

In block 200K, for each of the CBSD(s) 213 of the plurality of CBSDs and using the at least one available bandwidth identified by a baseband component that is part of a corresponding CBSD, the spectrum proxy selects at least one of at least one of the at least one of the at least one available frequency channel received in a grant response for the corresponding CBSD. Such selection may be made in one of many different ways.

Figure 3:
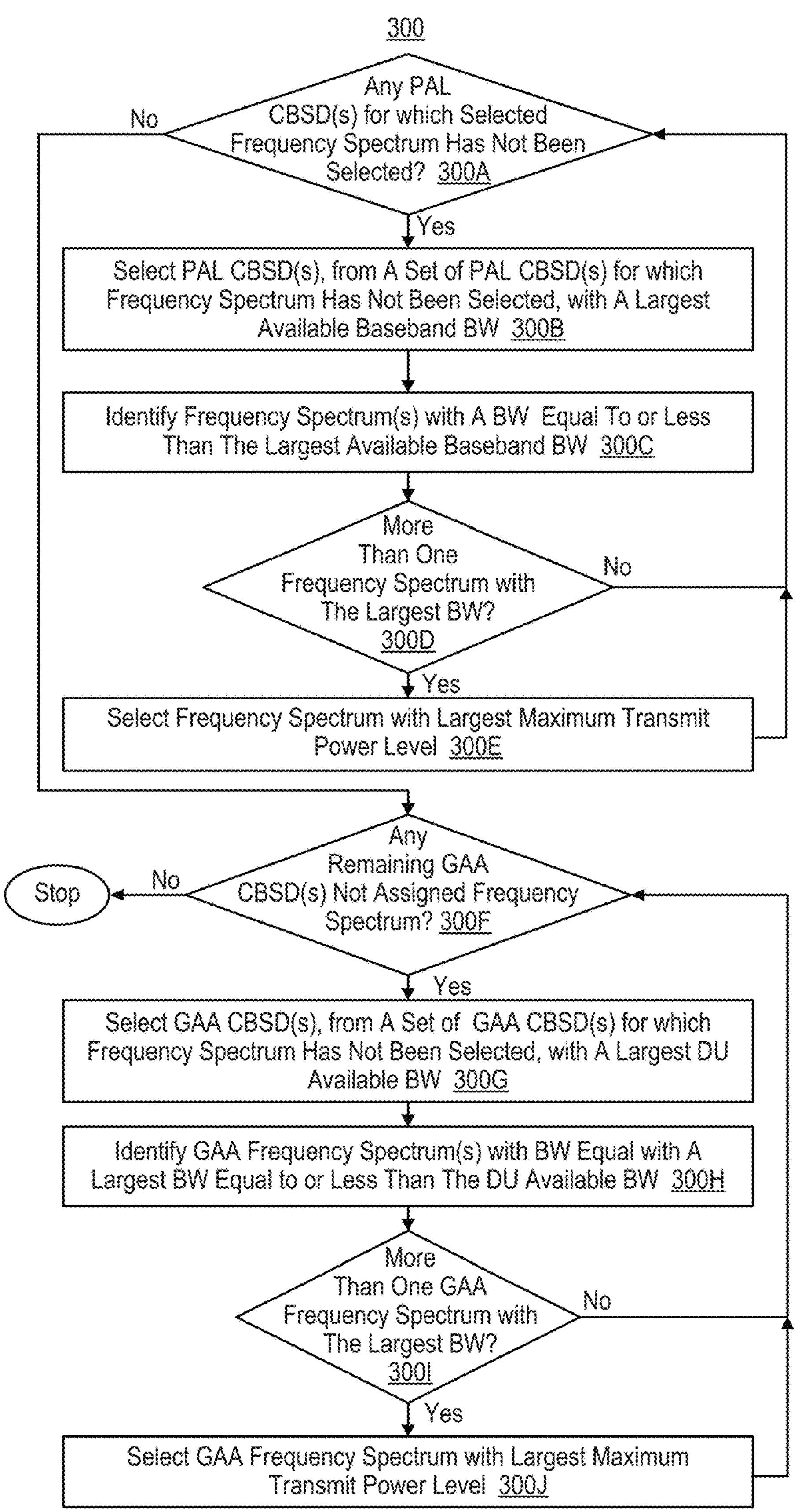
FIG. 3 illustrates a flow diagram of one embodiment of method of selecting frequency spectrum for a CBSD.

For pedagogical purposes, FIG. 3 illustrates a flow diagram of one embodiment of method 300 of selecting frequency spectrum for a CBSD. To the extent that the methods shown in any of the Figures is described herein as being implemented in the system shown in FIG. 1A, it is to be understood that other embodiments can be implemented in other ways. Thus, for example, the performance of method 300 by a spectrum proxy is solely for pedagogical purposes. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 300A, the spectrum proxy determines whether there are PAL CBSD(s) of the plurality of CBSDs to which frequency spectrum has not been assigned. If there are no PAL CBSD(s) to which frequency spectrum has not been assigned, then proceed to block 300F; this would include there being no PAL CBSDs in the plurality of CBSDs. A PAL CBSD means a CBSD utilized by a PAL user.

If there are PAL CBSD(s) to which frequency spectrum has not been assigned, then in block 300B, the spectrum proxy selects, from a set of PAL CBSDs, one or more PAL CBSDs and for which frequency spectrum has not been selected and which has a largest available baseband bandwidth. Spectrum is selected for more than one PAL CBSD when the more than one CBSD is part of an ICG and has the largest available baseband bandwidth. Optionally, each ICG consists of CBSDs each including the same baseband component; such baseband component has one or more available bandwidths. Optionally, the largest available bandwidth of each baseband component is a lesser of the largest available bandwidth identified by a baseband component and the assigned bandwidth of the baseband component. The assigned bandwidth of the baseband component may be assigned by a network operator, e.g., in the network operator's agreement algorithm 103A.

In block 300C, the spectrum proxy identifies one or more frequency spectrum, in frequency spectrum in which each of the selected CBSDs is authorized to transmit by the SAS, having a largest bandwidth (BW) that is equal to or less than the largest available baseband bandwidth. In block 300D, the spectrum proxy determines if there is more than one frequency spectrum identified as having the same largest bandwidth. In block 300E, if there is more than one frequency spectrum identified as having the same largest bandwidth, then the spectrum proxy selects a frequency spectrum (from the one or more frequency spectrum having the largest bandwidth that is equal to or less than the largest available baseband bandwidth) that has a largest (or largest average or mean) maximum transmit power level (e.g., EIRP). If there is more than one PAL CBSD for which frequency spectrum is being selected, then the largest average or mean maximum transmit power level is used.

Optionally, if there is more than one frequency spectrum (having the largest bandwidth that is equal to or less than the largest available baseband bandwidth and the same largest (or largest average or mean) maximum transmit power level) and more than one PAL CBSD for which a frequency spectrum is being selected, then select the frequency spectrum having a smallest variation (e.g., variance) in maximum transmit power level amongst such more than one PAL CBSD.

In block 300F, the spectrum proxy determines whether there are GAA CBSD(s) of the plurality of CBSDs to which frequency spectrum has not been assigned. If there are no GAA CBSD(s) to which frequency spectrum has not been assigned, then the method would stop; this would include there being no GAA CBSDs in the plurality of CBSDs. A GAA CBSD means a CBSD utilized by a GAA user.

If there are GAA CBSD(s) to which frequency spectrum has not been assigned, then in block 300G, the spectrum proxy selects, from a set of GAA CBSDs, one or more GAA CBSDs and for which frequency spectrum has not been selected and which has a largest available baseband bandwidth. Spectrum is selected for more than one PAL CBSD when the more than one CBSD is part of an ICG and has the largest available DU available bandwidth. Optionally, in the plurality of CBSDs, each ICG consists of CBSDs each including the same baseband component, where such baseband component has one or more available bandwidths. Optionally, the largest available baseband bandwidth of each baseband component is a lesser of the largest available bandwidth identified by a baseband component and the assigned bandwidth of the baseband component. The assigned bandwidth for the baseband component may be assigned by a network operator, e.g., in the network operator's agreement algorithm 103A.

In block 300H, the spectrum proxy identifies one or more GAA frequency spectrum, in frequency spectrum in which each of the selected CBSDs is authorized to transmit by the SAS, having a largest bandwidth (BW) that is equal to or less than the largest DU available bandwidth. In block 300I, the spectrum proxy determines if there is more than one GAA frequency spectrum identified as having the same largest bandwidth. In block 300J, if there is more than one GAA frequency spectrum identified as having the same largest bandwidth, then the spectrum proxy selects a GAA frequency spectrum (from the one or more frequency spectrum having the largest bandwidth that is equal to or less than the largest DU available bandwidth) that has a largest (or largest average or mean) maximum transmit power level (e.g., EIRP). If there is more than one GAA CBSD for which frequency spectrum is being selected, then the largest average or mean maximum transmit power level is used. Optionally, if there is more than one GAA frequency spectrum (having the largest bandwidth that is equal to or less than the largest DU available bandwidth and the same largest (or largest average or mean) maximum transmit power level) and more than one GAA CBSD for which a GAA frequency spectrum is being selected, then select the GAA frequency spectrum having a smallest variation (e.g., variance) in maximum transmit power level amongst such more than one GAA CBSD.

Returning to FIG. 2, in block 200L, the spectrum proxy 203 transmits, to the SAS 204, a heartbeat request for each of the CBSD(s) 213. The heartbeat request asks the SAS if the CBSD can transmit with parameters sent in the grant request. In block 200M, in block 200L, the spectrum proxy receives, from the SAS 204, a heartbeat response which authorizes the CBSD (on whose behalf the spectrum proxy sent the heartbeat request) to transmit for a time period, e.g., 240 seconds. Transmission of the heartbeat request and receipt of the heartbeat response are periodically or aperiodically repeated, e.g., even after each of blocks 200M and 200N.

In block 200N, the spectrum proxy 203 receives a status notification from each of CBSD(s) 213 that a corresponding CBSD is ready to transmit and receive. Such status notifications may be received at about the same time or at different times. In block 200O, the spectrum proxy 203 transmits, to the corresponding CBSD, an acknowledgement of receipt in response to each status notification received by the spectrum proxy 203 and a grant of frequency spectrum and maximum transmit power level (e.g., in EIRP) selected for the corresponding CBSD.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

EXEMPLARY EMBODIMENTS

Example 1 includes a method of efficiently assigning frequency channels to one or more citizen broadband radio service devices (CBSDs) of a plurality of CBSDs, the method comprising: receiving CBSD registration information from each CBSD of the plurality of CBSDs; transmitting, to a spectrum access system (SAS) and for each CBSD of the plurality of CBSDs, a registration request including the CBSD registration information; receiving, at the SAS, a registration response, for each CBSD, indicating successful registration of a CBSD; transmitting, to the SAS configured to regulate transmissions of at least one CBSD in frequency spectrum shared with at least one other apparatus, a frequency spectrum inquiry for each CBSD of the plurality of CBSDs; receiving, from the SAS, a frequency spectrum inquiry response for each CBSD of the plurality of CBSDs, wherein each frequency spectrum inquiry response includes at least one available frequency channel in which the SAS is configured to permit CBSD transmission; transmitting, to the SAS, a grant request, for each CBSD of the plurality of CBSDs, for at least one of the at least one available frequency channel identified in the frequency spectrum inquiry response for a CBSD of the plurality of CBSDs on whose behalf a corresponding grant request is transmitted; receiving, from the SAS, a grant request response for each CBSD of the plurality of CBSDs and which includes (x) authorization to transmit in at least one of the at least one of the at least one available frequency channel and (y) a maximum transmit power level corresponding to each of the at least one of the at least one of the at least one available frequency channel; transmitting, to each baseband component of the plurality of CBSDs, a query for information; receiving, from each baseband component of the plurality of CBSDs, a query response including information including at least one bandwidth at which a baseband component, which sent a corresponding query response, can operate; for each CBSD of the plurality of CBSDs and using the at least one bandwidth at which a baseband component, which is part of a corresponding CBSD of the plurality of CBSDs, can operate, selecting at least one of at least one of the at least one of the at least one available frequency channel received in a grant response for the corresponding CBSD of the plurality of CBSDs; transmitting, to the SAS and for each CBSD, a heartbeat request; receiving, from the SAS and for each CBSD, a heartbeat response authorizing CBSD transmission using parameters sent in the corresponding grant request; receiving a status notification from each CBSD of the plurality of CBSDs indicating that a CBSD, which sent a corresponding status notification, is ready to transmit and receive; and transmitting, to each CBSD, an acknowledgement of receipt of a status notification and selected one or more available frequency channels and a corresponding maximum transmit power level.

Example 2 includes the method of Example 1, wherein the frequency spectrum inquiry response includes a maximum transmit power level for each available frequency channel.

Example 3 includes the method of any of Examples 1-2, further comprising selecting, for each CBSD of the plurality of CBSDs, at least one of the at least one available frequency channel identified in a frequency spectrum inquiry response for a corresponding CBSD of the plurality of CBSDs; and wherein transmitting the grant request further comprises transmitting, to the SAS, a grant request, for each CBSD of the plurality of CBSDs, for selected at least one of the at least one available frequency channel.

Example 4 includes the method of any of Examples 1-3, wherein selecting at least one of at least one of the at least one of the at least one available frequency channel received in a grant response for the corresponding CBSD of the plurality of CBSDs comprises: determining whether at least one CBSD used by a priority access license (PAL) user has not been assigned at least one frequency channel; determining that at least one CBSD used by the PAL user has not been assigned at least one frequency channel, then selecting one or more CBSDs, used by one or more PAL users and that have not been assigned the at least one frequency channel, including a baseband component that has a largest available bandwidth; identifying each of at least one authorized frequency channel with a bandwidth equal to or less than the largest available bandwidth; determining whether there is more than one of the at least one authorized frequency channel with a bandwidth equal to or less than the largest available bandwidth, then selecting the at least one authorized frequency channel with a largest corresponding maximum transmit power level; determining whether at least one CBSD used by a general authorized access (GAA) user has not been assigned at least one frequency channel; determining that at least one CBSD used by the GAA user has not been assigned at least one frequency channel, then selecting one or more CBSDs, used by the GAA user and that have not been assigned the at least one frequency channel, including a baseband component that has the largest available bandwidth; identifying each of at least one authorized GAA frequency channel with a bandwidth equal to or less than the largest available bandwidth; and determining whether there is more than one of the at least one authorized GAA frequency channel with a bandwidth equal to or less than the largest available bandwidth, then selecting the at least one authorized GAA frequency channel with a largest corresponding maximum transmit power level.

Example 5 includes the method of Example 4, further comprising receiving an assigned bandwidth for each baseband component; and wherein the largest available bandwidth of each baseband component is a lesser of the largest available bandwidth identified by a baseband component and the assigned bandwidth for the baseband component.

Example 6 includes the method of any of Examples 1-5, wherein, with an exception of actions related to obtaining registration information of each CBSD of the plurality of CBSDs and registering each CBSD of the plurality of CBSDs with the SAS, the actions are performed prior to every coordinated periodic activities among SASs.

Example 7 includes a program product comprising a non-transitory processor readable medium on which program instructions are embodied, wherein the program instructions are configured, when executed by at least one programmable processor, to cause the at least one programmable processor to execute a process to efficiently assign frequency channels to one or more citizen broadband radio service devices (CBSDs) of a plurality of CBSDs, the process comprising: receiving CBSD registration information from each CBSD of the plurality of CBSDs; causing transmission, to a spectrum access system (SAS) and for each CBSD of the plurality of CBSDs, of a registration request including the CBSD registration information; receiving, at the SAS, a registration response, for each CBSD, indicating successful registration of a CBSD; causing transmission, to the SAS configured to regulate transmissions of at least one CBSD in frequency spectrum shared with at least one other apparatus, of a frequency spectrum inquiry for each CBSD of the plurality of CBSDs; receiving, from the SAS, a frequency spectrum inquiry response for each CBSD of the plurality of CBSDs, wherein each frequency spectrum inquiry response includes at least one available frequency channel in which the SAS is configured to permit CBSD transmission; causing transmission, to the SAS, of a grant request, for each CBSD of the plurality of CBSDs, for at least one of the at least one available frequency channel identified in the frequency spectrum inquiry response for a CBSD of the plurality of CBSDs on whose behalf a corresponding grant request is transmitted; receiving, from the SAS, a grant request response for each CBSD of the plurality of CBSDs and which includes (x) authorization to transmit in at least one of the at least one of the at least one available frequency channel and (y) a maximum transmit power level corresponding to each of the at least one of the at least one of the at least one available frequency channel; causing transmission, to each baseband component of the plurality of CBSDs, of a query for information; receiving, from each baseband component of the plurality of CBSDs, a query response including information including at least one bandwidth at which a baseband component, which sent a corresponding query response, can operate; for each CBSD of the plurality of CBSDs and using the at least one bandwidth at which a baseband component, which is part of a corresponding CBSD of the plurality of CBSDs, can operate, selecting at least one of at least one of the at least one of the at least one available frequency channel received in a grant response for the corresponding CBSD of the plurality of CBSDs; causing transmission, to the SAS and for each CBSD, of a heartbeat request; receiving, from the SAS and for each CBSD, a heartbeat response authorizing CBSD transmission using parameters sent in the corresponding grant request; receiving a status notification from each CBSD of the plurality of CBSDs indicating that a CBSD, which sent a corresponding status notification, is ready to transmit and receive; and causing transmission, to each CBSD, of an acknowledgement of receipt of a status notification and selected one or more available frequency channels and a corresponding maximum transmit power level.

Example 8 includes the program product of Example 7, wherein the frequency spectrum inquiry response includes a maximum transmit power level for each available frequency channel.

Example 9 includes the program product of any of Examples 7-8, wherein the process further comprises selecting, for each CBSD of the plurality of CBSDs, at least one of the at least one available frequency channel identified in a frequency spectrum inquiry response for a corresponding CBSD of the plurality of CBSDs; and wherein causing transmission of the grant request further comprises causing transmission, to the SAS, of a grant request, for each CBSD of the plurality of CBSDs, for selected at least one of the at least one available frequency channel.

Example 10 includes the program product of any of Examples 7-9, wherein selecting at least one of at least one of the at least one of the at least one available frequency channel received in a grant response for the corresponding CBSD of the plurality of CBSDs comprises: determining whether at least one CBSD used by a priority access license (PAL) user has not been assigned at least one frequency channel; determining that at least one CBSD used by the PAL user has not been assigned at least one frequency channel, then selecting one or more CBSDs, used by one or more PAL users and that have not been assigned the at least one frequency channel, including a baseband component that has a largest available bandwidth; identifying each of at least one authorized frequency channel with a bandwidth equal to or less than the largest available bandwidth; determining whether there is more than one of the at least one authorized frequency channel with a bandwidth equal to or less than the largest available bandwidth, then selecting the at least one authorized frequency channel with a largest corresponding maximum transmit power level; determining whether at least one CBSD used by a general authorized access (GAA) user has not been assigned at least one frequency channel; determining that at least one CBSD used by the GAA user has not been assigned at least one frequency channel, then selecting one or more CBSDs, used by the GAA user and that have not been assigned the at least one frequency channel, including a baseband component that has the largest available bandwidth; identifying each of at least one authorized GAA frequency channel with a bandwidth equal to or less than the largest available bandwidth; and determining whether there is more than one of the at least one authorized GAA frequency channel with a bandwidth equal to or less than the largest available bandwidth, then selecting the at least one authorized GAA frequency channel with a largest corresponding maximum transmit power level.

Example 11 includes the program product of Example 10, further comprising receiving an assigned bandwidth for each baseband component; and wherein the largest available bandwidth of each baseband component is a lesser of the largest available bandwidth identified by a baseband component and the assigned bandwidth for the baseband component.

Example 12 includes the program product of any of Examples 7-11, wherein, with an exception of actions related to obtaining registration information of each CBSD of the plurality of CBSDs and causing registration of each CBSD of the plurality of CBSDs with the SAS, the actions are performed prior to every coordinated periodic activities among SASs.

Example 13 includes an apparatus configured to efficiently assign frequency channels to one or more citizen broadband radio service devices (CBSDs) of a plurality of CBSDs, comprising: processor circuitry communicatively coupled to each CBSD of the plurality of CBSDs, communicatively coupled to a spectrum access system (SAS), and configured to: receive CBSD registration information from each CBSD of the plurality of CBSDs; cause transmission, to the SAS and for each CBSD of the plurality of CBSDs, of a registration request including the CBSD registration information; receive, at the SAS, a registration response, for each CBSD, indicating successful registration of a CBSD; cause transmission, to the SAS configured to regulate transmissions of at least one CBSD in frequency spectrum shared with at least one other apparatus, of a frequency spectrum inquiry for each CBSD of the plurality of CBSDs; receive, from the SAS, a frequency spectrum inquiry response for each CBSD of the plurality of CBSDs, wherein each frequency spectrum inquiry response includes at least one available frequency channel in which the SAS is configured to permit CBSD transmission; cause transmission, to the SAS, of a grant request, for each CBSD of the plurality of CBSDs, for at least one of the at least one available frequency channel identified in the frequency spectrum inquiry response for a CBSD of the plurality of CBSDs on whose behalf a corresponding grant request is transmitted; receive, from the SAS, a grant request response for each CBSD of the plurality of CBSDs and which includes (x) authorization to transmit in at least one of the at least one of the at least one available frequency channel and (y) a maximum transmit power level corresponding to each of the at least one of the at least one of the at least one available frequency channel; transmitting, to each baseband component of the plurality of CBSDs, a query for information; receive, from each baseband component of the plurality of CBSDs, a query response including information including at least one bandwidth at which a baseband component, which sent a corresponding query response, can operate; for each CBSD of the plurality of CBSDs and using the at least one bandwidth at which a baseband component, which is part of a corresponding CBSD of the plurality of CBSDs, can operate, select at least one of at least one of the at least one of the at least one available frequency channel received in a grant response for the corresponding CBSD of the plurality of CBSDs; cause transmission, to the SAS and for each CBSD, of a heartbeat request; receive, from the SAS and for each CBSD, a heartbeat response authorizing CBSD transmission using parameters sent in the corresponding grant request; receive a status notification from each CBSD of the plurality of CBSDs indicating that a CBSD, which sent a corresponding status notification, is ready to transmit and receive; and cause transmission, to each CBSD, of an acknowledgement of receipt of a status notification and selected one or more available frequency channels and a corresponding maximum transmit power level.

Example 14 includes the apparatus of Example 13, wherein the frequency spectrum inquiry response includes a maximum transmit power level for each available frequency channel.

Example 15 includes the apparatus of any of Examples 13-14, wherein the processor circuitry is further configured to select, for each CBSD of the plurality of CBSDs, at least one of the at least one available frequency channel identified in a frequency spectrum inquiry response for a corresponding CBSD of the plurality of CBSDs; and wherein causing transmission of the grant request further comprises causing transmission, to the SAS, of a grant request, for each CBSD of the plurality of CBSDs, for selected at least one of the at least one available frequency channel.

Example 16 includes the apparatus of any of Examples 13-15, wherein select at least one of at least one of the at least one of the at least one available frequency channel received in a grant response for the corresponding CBSD of the plurality of CBSDs comprises: determine whether at least one CBSD used by a priority access license (PAL) user has not been assigned at least one frequency channel; determine that at least one CBSD used by the PAL user has not been assigned at least one frequency channel, then selecting one or more CBSDs, used by one or more PAL users and that have not been assigned the at least one frequency channel, including a baseband component that has a largest available bandwidth; identify each of at least one authorized frequency channel with a bandwidth equal to or less than the largest available bandwidth; determine whether there is more than one of the at least one authorized frequency channel with a bandwidth equal to or less than the largest available bandwidth, then selecting the at least one authorized frequency channel with a largest corresponding maximum transmit power level; determine whether at least one CBSD used by a general authorized access (GAA) user has not been assigned at least one frequency channel; determine that at least one CBSD used by the GAA user has not been assigned at least one frequency channel, then selecting one or more CBSDs, used by the GAA user and that have not been assigned the at least one frequency channel, including a baseband component that has the largest available bandwidth; identify each of at least one authorized GAA frequency channel with a bandwidth equal to or less than the largest available bandwidth; and determine whether there is more than one of the at least one authorized GAA frequency channel with a bandwidth equal to or less than the largest available bandwidth, then selecting the at least one authorized GAA frequency channel with a largest corresponding maximum transmit power level.

Example 17 includes the apparatus of Example 16, wherein the processor circuitry is further configured to receive an assigned bandwidth for each baseband component; and wherein the largest available bandwidth of each baseband component is a lesser of the largest available bandwidth identified by a baseband component and the assigned bandwidth for the baseband component.

Example 18 includes the apparatus of any of Examples 13-17, wherein, with an exception of actions related to obtaining registration information of each CBSD of the plurality of CBSDs and causing registration of each CBSD of the plurality of CBSDs with the SAS, the actions are performed prior to every coordinated periodic activities among SASs.

Example 19 includes the apparatus of any of Examples 13-18, wherein the processor circuitry is further configured to translate communications protocols used by the SAS and each CBSD of the plurality of CBSDs.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed:

1. A method of efficiently assigning frequency channels to one or more citizen broadband radio service devices (CBSDs) of a plurality of CBSDs, the method comprising:

receiving CBSD registration information from each CBSD of the plurality of CBSDs;

transmitting, to a spectrum access system (SAS) and for each CBSD of the plurality of CBSDs, a registration request including the CBSD registration information;

receiving, at the SAS, a registration response, for each CBSD, indicating successful registration of a CBSD;

transmitting, to the SAS configured to regulate transmissions of at least one CBSD in frequency spectrum shared with at least one other apparatus, a frequency spectrum inquiry for each CBSD of the plurality of CBSDs;

receiving, from the SAS, a frequency spectrum inquiry response for each CBSD of the plurality of CBSDs, wherein each frequency spectrum inquiry response includes at least one available frequency channel in which the SAS is configured to permit CBSD transmission;

transmitting, to the SAS, a grant request, for each CBSD of the plurality of CBSDs, for at least one of the at least one available frequency channel identified in the frequency spectrum inquiry response for a CBSD of the plurality of CBSDs on whose behalf a corresponding grant request is transmitted;

receiving, from the SAS, a grant request response for each CBSD of the plurality of CBSDs and which includes (x) authorization to transmit in at least one of the at least one of the at least one available frequency channel and (y) a maximum transmit power level corresponding to each of the at least one of the at least one of the at least one available frequency channel;

transmitting, to each baseband component of the plurality of CBSDs, a query for information;

receiving, from each baseband component of the plurality of CBSDs, a query response including information including at least one bandwidth at which a baseband component, which sent a corresponding query response, can operate;

for each CBSD of the plurality of CBSDs and using the at least one bandwidth at which a baseband component, which is part of a corresponding CBSD of the plurality of CBSDs, can operate, selecting at least one of at least one of the at least one of the at least one available frequency channel received in a grant response for the corresponding CBSD of the plurality of CBSDs;

transmitting, to the SAS and for each CBSD, a heartbeat request;

receiving, from the SAS and for each CBSD, a heartbeat response authorizing CBSD transmission using parameters sent in the corresponding grant request;

receiving a status notification from each CBSD of the plurality of CBSDs indicating that a CBSD, which sent a corresponding status notification, is ready to transmit and receive; and transmitting, to each CBSD, an acknowledgement of receipt of a status notification and selected one or more available frequency channels and a corresponding maximum transmit power level.

2. The method of claim 1, wherein the frequency spectrum inquiry response includes a maximum transmit power level for each available frequency channel.

3. The method of claim 1, further comprising selecting, for each CBSD of the plurality of CBSDs, at least one of the at least one available frequency channel identified in a frequency spectrum inquiry response for a corresponding CBSD of the plurality of CBSDs; and wherein transmitting the grant request further comprises transmitting, to the SAS, a grant request, for each CBSD of the plurality of CBSDs, for selected at least one of the at least one available frequency channel.

4. The method of claim 1, wherein selecting at least one of at least one of the at least one of the at least one available frequency channel received in a grant response for the corresponding CBSD of the plurality of CBSDs comprises:

determining whether at least one CBSD used by a priority access license (PAL) user has not been assigned at least one frequency channel;

determining that at least one CBSD used by the PAL user has not been assigned at least one frequency channel, then selecting one or more CBSDs, used by one or more PAL users and that have not been assigned the at least one frequency channel, including a baseband component that has a largest available bandwidth;

identifying each of at least one authorized frequency channel with a bandwidth equal to or less than the largest available bandwidth;

determining whether there is more than one of the at least one authorized frequency channel with a bandwidth equal to or less than the largest available bandwidth, then selecting the at least one authorized frequency channel with a largest corresponding maximum transmit power level;

determining whether at least one CBSD used by a general authorized access (GAA) user has not been assigned at least one frequency channel;

determining that at least one CBSD used by the GAA user has not been assigned at least one frequency channel, then selecting one or more CBSDs, used by the GAA user and that have not been assigned the at least one frequency channel, including a baseband component that has the largest available bandwidth;

identifying each of at least one authorized GAA frequency channel with a bandwidth equal to or less than the largest available bandwidth; and determining whether there is more than one of the at least one authorized GAA frequency channel with a bandwidth equal to or less than the largest available bandwidth, then selecting the at least one authorized GAA frequency channel with a largest corresponding maximum transmit power level.

5. The method of claim 4, further comprising receiving an assigned bandwidth for each baseband component; and wherein the largest available bandwidth of each baseband component is a lesser of the largest available bandwidth identified by a baseband component and the assigned bandwidth for the baseband component.

6. The method of claim 1, wherein, with an exception of actions related to obtaining registration information of each CBSD of the plurality of CBSDs and registering each CBSD of the plurality of CBSDs with the SAS, the actions are performed prior to every coordinated periodic activities among SASs.

7. A program product comprising a non-transitory processor readable medium on which program instructions are embodied, wherein the program instructions are configured, when executed by at least one programmable processor, to cause the at least one programmable processor to execute a process to efficiently assign frequency channels to one or more citizen broadband radio service devices (CBSDs) of a plurality of CBSDs, the process comprising:

receiving CBSD registration information from each CBSD of the plurality of CBSDs;

causing transmission, to a spectrum access system (SAS) and for each CBSD of the plurality of CBSDs, of a registration request including the CBSD registration information;

receiving, at the SAS, a registration response, for each CBSD, indicating successful registration of a CBSD;

causing transmission, to the SAS configured to regulate transmissions of at least one CBSD in frequency spectrum shared with at least one other apparatus, of a frequency spectrum inquiry for each CBSD of the plurality of CBSDs;

receiving, from the SAS, a frequency spectrum inquiry response for each CBSD of the plurality of CBSDs, wherein each frequency spectrum inquiry response includes at least one available frequency channel in which the SAS is configured to permit CBSD transmission;

causing transmission, to the SAS, of a grant request, for each CBSD of the plurality of CBSDs, for at least one of the at least one available frequency channel identified in the frequency spectrum inquiry response for a CBSD of the plurality of CBSDs on whose behalf a corresponding grant request is transmitted;

receiving, from the SAS, a grant request response for each CBSD of the plurality of CBSDs and which includes (x) authorization to transmit in at least one of the at least one of the at least one available frequency channel and (y) a maximum transmit power level corresponding to each of the at least one of the at least one of the at least one available frequency channel;

causing transmission, to each baseband component of the plurality of CBSDs, of a query for information;

receiving, from each baseband component of the plurality of CBSDs, a query response including information including at least one bandwidth at which a baseband component, which sent a corresponding query response, can operate;

for each CBSD of the plurality of CBSDs and using the at least one bandwidth at which a baseband component, which is part of a corresponding CBSD of the plurality of CBSDs, can operate, selecting at least one of at least one of the at least one of the at least one available frequency channel received in a grant response for the corresponding CBSD of the plurality of CBSDs;

causing transmission, to the SAS and for each CBSD, of a heartbeat request;

receiving, from the SAS and for each CBSD, a heartbeat response authorizing CBSD transmission using parameters sent in the corresponding grant request;

receiving a status notification from each CBSD of the plurality of CBSDs indicating that a CBSD, which sent a corresponding status notification, is ready to transmit and receive; and causing transmission, to each CBSD, of an acknowledgement of receipt of a status notification and selected one or more available frequency channels and a corresponding maximum transmit power level.

8. The program product of claim 7, wherein the frequency spectrum inquiry response includes a maximum transmit power level for each available frequency channel.

9. The program product of claim 7, wherein the process further comprises selecting, for each CBSD of the plurality of CBSDs, at least one of the at least one available frequency channel identified in a frequency spectrum inquiry response for a corresponding CBSD of the plurality of CBSDs; and wherein causing transmission of the grant request further comprises causing transmission, to the SAS, of a grant request, for each CBSD of the plurality of CBSDs, for selected at least one of the at least one available frequency channel.

10. The program product of claim 7, wherein selecting at least one of at least one of the at least one of the at least one available frequency channel received in a grant response for the corresponding CBSD of the plurality of CBSDs comprises:

determining whether at least one CBSD used by a priority access license (PAL) user has not been assigned at least one frequency channel;

determining that at least one CBSD used by the PAL user has not been assigned at least one frequency channel, then selecting one or more CBSDs, used by one or more PAL users and that have not been assigned the at least one frequency channel, including a baseband component that has a largest available bandwidth;

identifying each of at least one authorized frequency channel with a bandwidth equal to or less than the largest available bandwidth;

determining whether there is more than one of the at least one authorized frequency channel with a bandwidth equal to or less than the largest available bandwidth, then selecting the at least one authorized frequency channel with a largest corresponding maximum transmit power level;

determining whether at least one CBSD used by a general authorized access (GAA) user has not been assigned at least one frequency channel;

determining that at least one CBSD used by the GAA user has not been assigned at least one frequency channel, then selecting one or more CBSDs, used by the GAA user and that have not been assigned the at least one frequency channel, including a baseband component that has the largest available bandwidth;

identifying each of at least one authorized GAA frequency channel with a bandwidth equal to or less than the largest available bandwidth; and determining whether there is more than one of the at least one authorized GAA frequency channel with a bandwidth equal to or less than the largest available bandwidth, then selecting the at least one authorized GAA frequency channel with a largest corresponding maximum transmit power level.

11. The program product of claim 10, further comprising receiving an assigned bandwidth for each baseband component; and wherein the largest available bandwidth of each baseband component is a lesser of the largest available bandwidth identified by a baseband component and the assigned bandwidth for the baseband component.

12. The program product of claim 7, wherein, with an exception of actions related to obtaining registration information of each CBSD of the plurality of CBSDs and causing registration of each CBSD of the plurality of CBSDs with the SAS, the actions are performed prior to every coordinated periodic activities among SASs.

13. An apparatus configured to efficiently assign frequency channels to one or more citizen broadband radio service devices (CBSDs) of a plurality of CBSDs, comprising:

processor circuitry communicatively coupled to each CBSD of the plurality of CBSDs, communicatively coupled to a spectrum access system (SAS), and configured to:

receive CBSD registration information from each CBSD of the plurality of CBSDs;

cause transmission, to the SAS and for each CBSD of the plurality of CBSDs, of a registration request including the CBSD registration information;

receive, at the SAS, a registration response, for each CBSD, indicating successful registration of a CBSD;

cause transmission, to the SAS configured to regulate transmissions of at least one CBSD in frequency spectrum shared with at least one other apparatus, of a frequency spectrum inquiry for each CBSD of the plurality of CBSDs;

receive, from the SAS, a frequency spectrum inquiry response for each CBSD of the plurality of CBSDs, wherein each frequency spectrum inquiry response includes at least one available frequency channel in which the SAS is configured to permit CBSD transmission;

cause transmission, to the SAS, of a grant request, for each CBSD of the plurality of CBSDs, for at least one of the at least one available frequency channel identified in the frequency spectrum inquiry response for a CBSD of the plurality of CBSDs on whose behalf a corresponding grant request is transmitted;

receive, from the SAS, a grant request response for each CBSD of the plurality of CBSDs and which includes (x) authorization to transmit in at least one of the at least one of the at least one available frequency channel and (y) a maximum transmit power level corresponding to each of the at least one of the at least one of the at least one available frequency channel;

transmitting, to each baseband component of the plurality of CBSDs, a query for information;

receive, from each baseband component of the plurality of CBSDs, a query response including information including at least one bandwidth at which a baseband component, which sent a corresponding query response, can operate;

for each CBSD of the plurality of CBSDs and using the at least one bandwidth at which a baseband component, which is part of a corresponding CBSD of the plurality of CBSDs, can operate, select at least one of at least one of the at least one of the at least one available frequency channel received in a grant response for the corresponding CBSD of the plurality of CBSDs;

cause transmission, to the SAS and for each CBSD, of a heartbeat request;

receive, from the SAS and for each CBSD, a heartbeat response authorizing CBSD transmission using parameters sent in the corresponding grant request;

receive a status notification from each CBSD of the plurality of CBSDs indicating that a CBSD, which sent a corresponding status notification, is ready to transmit and receive; and cause transmission, to each CBSD, of an acknowledgement of receipt of a status notification and selected one or more available frequency channels and a corresponding maximum transmit power level.

14. The apparatus of claim 13, wherein the frequency spectrum inquiry response includes a maximum transmit power level for each available frequency channel.

15. The apparatus of claim 13, wherein the processor circuitry is further configured to select, for each CBSD of the plurality of CBSDs, at least one of the at least one available frequency channel identified in a frequency spectrum inquiry response for a corresponding CBSD of the plurality of CBSDs; and wherein causing transmission of the grant request further comprises causing transmission, to the SAS, of a grant request, for each CBSD of the plurality of CBSDs, for selected at least one of the at least one available frequency channel.

16. The apparatus of claim 13, wherein select at least one of at least one of the at least one of the at least one available frequency channel received in a grant response for the corresponding CBSD of the plurality of CBSDs comprises:

determine whether at least one CBSD used by a priority access license (PAL) user has not been assigned at least one frequency channel;

determine that at least one CBSD used by the PAL user has not been assigned at least one frequency channel, then selecting one or more CBSDs, used by one or more PAL users and that have not been assigned the at least one frequency channel, including a baseband component that has a largest available bandwidth;

identify each of at least one authorized frequency channel with a bandwidth equal to or less than the largest available bandwidth;

determine whether there is more than one of the at least one authorized frequency channel with a bandwidth equal to or less than the largest available bandwidth, then selecting the at least one authorized frequency channel with a largest corresponding maximum transmit power level;

determine whether at least one CBSD used by a general authorized access (GAA) user has not been assigned at least one frequency channel;

determine that at least one CBSD used by the GAA user has not been assigned at least one frequency channel, then selecting one or more CBSDs, used by the GAA user and that have not been assigned the at least one frequency channel, including a baseband component that has the largest available bandwidth;

identify each of at least one authorized GAA frequency channel with a bandwidth equal to or less than the largest available bandwidth; and determine whether there is more than one of the at least one authorized GAA frequency channel with a bandwidth equal to or less than the largest available bandwidth, then selecting the at least one authorized GAA frequency channel with a largest corresponding maximum transmit power level.

17. The apparatus of claim 16, wherein the processor circuitry is further configured to receive an assigned bandwidth for each baseband component; and wherein the largest available bandwidth of each baseband component is a lesser of the largest available bandwidth identified by a baseband component and the assigned bandwidth for the baseband component.

18. The apparatus of claim 13, wherein, with an exception of actions related to obtaining registration information of each CBSD of the plurality of CBSDs and causing registration of each CBSD of the plurality of CBSDs with the SAS, the actions are performed prior to every coordinated periodic activities among SASs.

19. The apparatus of claim 13, wherein the processor circuitry is further configured to translate communications protocols used by the SAS and each CBSD of the plurality of CBSDs.

* * * * *